Patented Aug. 27, 1929.

1,726,473

UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

COATING COMPOSITION.

No Drawing.  Application filed August 24, 1925.  Serial No. 52,215.

The present invention comprises an improved coating composition of the class of japans or varnishes, and in particular to the class of coating composition known as "water japan" comprising an emulsion or suspension in water of ingredients capable of being hardened by baking when applied as a film or coating.

As described in United States Patent No. 1,294,422 and of my various other prior patents, water japan commonly comprises a japan base consisting of a bituminous material, for example, such as gilsonite, combined with an oleaginous material, for example, a drying oil, such as linseed oil, or chinawood oil. Various modifying or coloring ingredients may be added. When the base is emulsified in water, a paint-like composition is formed which may be applied as a coating, for example, by electro-deposition or by dipping the articles to be coated while hot into the composition. The coated object is dried and then usually is baked.

Although the baked coating ordinarily is mechanically and chemically protective, some difficulty has been experienced due to the failure of the baked coating to adhere well to sharp edges of metal objects and also in not being sufficiently resistant to corrosion under some conditions.

In accordance with my present invention, I have improved the property of the japan both in its resistance to corrosion and also to its adherence to the coated surface, especially at sharp edges, by the addition of rubber as a constituent. The rubber may be either incorporated into the base, for example, by dissolving it in the oil, or it may be added to the japan emulsion as a rubber latex. As rubber is apt to cause scumming of the japan due to its rising to the surface, a material may be added having a density somewhat greater than water, for example, lampblack or clay. By uniting with the rubber droplets, such a loading material prevents scumming by the rising of the droplets of rubber to the surface.

The following example illustrates a preferred embodiment of my invention. A japan base is prepared by heating the following ingredients until saponification of a part of the oil and blending of the constituents occurs. 85 pounds of oxidized linseed oil; 85 pounds of oxidized china-wood oil; 50 pounds of rubber gum; 10 pounds of lamp black; 10 pounds of sodium carbonate.

These ingredients are heated to about 250° C. for about two hours or for a sufficient length of time to produce a homogeneous mixture, and to cause dispersion of the soap formed by the saponification of some of the oil. The soap acts as an emulsifying agent. The asphaltic material and other ingredients then are added. For example, to the above mass 150 pounds of gilsonite and 10 pounds of rosin may be added. In some cases a small quantity, say 5 pounds of sulphur may be added to vulcanize the oils, gilsonite and rubber. The addition of these ingredients lowers the temperature somewhat. It is restored to about 250° C. and held for about one hour, or until complete solution occurs and the solids are dispersed throughout the mass. Boiling water finally is added to emulsify the base, thus produced, as described in my prior United States Patent No. 1,472,716 of October 30, 1923.

As already indicated the lampblack unites with rubber droplets in such a way that the density of the disperse phase of the emulsion, that is the japan base, is the same as the density of water forming the dispersion medium of the japan and hence no separation either by settling or "creaming" takes place.

Instead of adding rubber gum to the oils as above indicated, the other ingredients first may be mixed as indicated and finally after emulsification of the japan base in water, a quantity of rubber latex may be added. Lampblack or other loading material, preferably is dispersed in the latex before the latex is added to the japan. The addition of the rubber produces an attractive matte surface on the baked japan coating.

What I claim as new and desire to secure by Letters Patent of the United States, is:—

1. A coating composition comprising an emulsion in water of asphalt, oleaginous material and rubber, said composition being capable of being converted by baking to a hard, corrosion resistant solid, having a matte surface.

2. A metal coating composition comprising water as a vehicle and a suspension therein of materials capable of being heat-hardened, said materials consisting mainly of asphalt and drying oil and including rubber latex as a minor constituent.

3. A metal coating japan comprising water as a dispersion medium and a disperse phase comprising japan base comprising bituminous material, a drying oil and rubber having in the aggregate a density less than water and a finely divided solid having a density greater than water, said constituents being combined in such proportion that the disperse phase has substantially the density of water.

4. A heat-hardening japan comprising an emulsion in water of an asphalt, a vegetable oil, rubber latex and an emulsifying agent.

5. A heat-hardening japan comprising an emulsion in water of the following ingredients by weight: about 17 parts of vegetable oil, about 15 parts of gilsonite, about 5 parts of rubber and about one part of lampblack.

In witness whereof, I have hereunto set my hand this 21st day of August 1925.

WHEELER P. DAVEY.